(12) United States Patent  (10) Patent No.: US 7,243,611 B2
Schumacher et al.  (45) Date of Patent: Jul. 17, 2007

(54) DRINKING TROUGH WITH ELONGATED ACTUATOR AND METHOD OF DISPENSING WATER THEREFROM

(75) Inventors: Egon Schumacher, Barnstorf (DE); Wolfgang Meyer, Barnstorf (DE)

(73) Assignee: Lubing Maschinenfabrik Ludwig (DE)

( * ) Notice: Subject to any disclaimer, the term of this patent is extended or adjusted under 35 U.S.C. 154(b) by 227 days.

(21) Appl. No.: 10/998,434

(22) Filed: Nov. 29, 2004

(65) Prior Publication Data

US 2005/0150464 A1    Jul. 14, 2005

Related U.S. Application Data

(63) Continuation-in-part of application No. 10/282,788, filed on Oct. 29, 2002, now Pat. No. 6,938,578.

(30) Foreign Application Priority Data

Nov. 2, 2001  (DE) ............................... 101 53 595
Apr. 10, 2002 (DE) ............................... 102 15 696

(51) Int. Cl.
*A01K 7/06* (2006.01)
(52) U.S. Cl. .......................................... 119/75; 119/54
(58) Field of Classification Search .................. 119/78, 119/79, 75, 74, 72.5, 72, 54
See application file for complete search history.

(56) References Cited

U.S. PATENT DOCUMENTS 1,172,584 A * 2/1916 Conrad ........................ 119/78
3,286,724 A * 11/1966 Sawyer ...................... 137/426
4,656,970 A * 4/1987 Hostetler ..................... 119/75

FOREIGN PATENT DOCUMENTS

WO    WO 0051420    * 9/2000

* cited by examiner

*Primary Examiner*—Timothy D. Collins
(74) *Attorney, Agent, or Firm*—Laurence P. Colton; Powell Goldstein LLP

(57) ABSTRACT

A drinking trough having a drinking valve assigned to a water-supply line, the drinking valve having a valve pin that moves in order to discharge water; a water-collecting bowl assigned to the respective drinking valve; an actuating means or elongated actuating end of the valve pin extending from the valve pin to a water-accommodating hollow of the water-collecting bowl, the actuating means being movable between an actuated position to an unactuated position; and a starter body assigned to the respective water-collecting bowl, in which the starter body actuates the actuating means by moving the actuating means to the actuated position when water in the water-collecting bowl reaches a certain lower level, whereby the moving of the actuating means to the actuated position actuates the valve pin so as to allow water to flow from the drinking valve into the water-collecting bowl, and when the water in the water-collecting bowl reaches a certain higher level, the actuating means moves to the unactuated position, whereby the moving of the actuating means unactuates the valve pin so as to cease the flow of water from the drinking valve.

22 Claims, 15 Drawing Sheets

DRINKING TROUGH WITH ELONGATED ACTUATOR AND METHOD OF DISPENSING WATER THEREFROM

STATEMENT OF RELATED APPLICATIONS

This patent application is a continuation-in-part of U.S. of America patent application Ser. No. 10/282,788 having a filing date of 29 Oct. 2002 now U.S. Pat. No. 6,938,578, currently pending, which claims Convention Priority on German Patent Application No. 10153595.3 having a filing date of 2 Nov. 2001 and German Patent Application No. 10215696.4 having a filing date of 10 Apr. 2002.

BACKGROUND OF THE INVENTION

1. Technical Field

The invention relates to a drinking trough for, in particular, poultry, such as turkeys, chickens, chicks or the like, having at least one drinking valve that is assigned to a water-supply line, the drinking valve having a valve pin that can be moved in order to discharge water, and additionally having at least one water-collecting bowl and a starter body, both being assigned to a respective drinking valve, and also to a method of dispensing or regulating water flow from a drinking valve into a water-collecting bowl.

2. Prior Art

Drinking troughs of the type mentioned here allow animals, in particular poultry such as, for example, turkeys, hens, geese, ducks and also the young of the aforementioned animals, to obtain automatically the water they require. For this purpose, the drinking trough has an elongate water-supply line, to which a plurality of drinking valves are preferably connected at regular intervals. Each drinking valve is assigned a water-collecting bowl. Water discharged by the drinking valve, to be precise in particular water that is not drunk directly by the animals, accumulates in the water-collecting bowl. As soon as most or all of the water supply in the water-collecting bowl has been used up (drunk by the animals, evaporated, splashed out of the water-collecting bowl, etcetera), the animals preferably can open a respective drinking valve for a short period of time directly, by means of their beaks or bills, and drink the water discharged from the supply line through the drinking valve either directly or from the collecting bowl.

The known drinking troughs of the type described above have proven successful for the most part for chickens, chicks and broilers. The known drinking troughs, however, have not proven successful for breeding and fattening turkeys. In particular young turkeys and turkey chicks are often not capable of actuating the drinking valves directly and it is problematic for young turkeys and turkey chicks to obtain the water they require via drinking valves. Moreover, the problems concerning the soiling of the water-collecting bowls and the splashing of water are more pronounced in the case of turkeys than in the case of other animals.

A recently developed drinking trough disclosed in U.S. Patent Application Publication No. 20030084854 to Schumacher addressed some of the difficulties experienced by young turkeys in using traditional drinking troughs. More particularly, that invention employs an elongated tubular structure, an elongated rod structure, or an elongated valve pin within an elongated tubular structure as an actuator lever to allow the bird to more easily actuate the drinking valve and receive a fresh supply of water. That invention further points out the utility of the elongated actuator levers in avoiding the problems of soiling and water splashing by permitting the water from the drinking valve to travel down the lever into a water-collecting bowl.

Accordingly, there is always a need for an improved drinking trough. More particularly, there is a need for a drinking trough, and a method for dispensing water therefrom, in which the problems concerning soiling and water splashing may be avoided in a relatively reliable manner and in which turkeys in particular, to be precise also turkey chicks, can automatically obtain the water they require to a sufficient extent, preferably throughout the breeding and fattening processes. Further, there is a need for such a drinking trough to be able to fill and refill automatically as water is removed from the drinking trough so as to allow even those birds incapable of activating the drinking valve to obtain water. It is to these needs among others that this invention is related.

BRIEF SUMMARY OF THE INVENTION

A drinking trough that achieves the object mentioned above is a drinking trough for, in particular, poultry, such as turkeys, chickens, chicks or the like, having at least one drinking valve that is assigned to a water-supply line and that has a valve pin that can be moved in order to discharge water, and at least one water-collecting bowl, characterized in that the valve pin is assigned an actuating means and a starter body for actuating the actuating means without direct contact between the animal and the actuating means. The actuating means typically is an actuating lever attached to the valve pin. Alternatively, an elongated portion of the valve pin itself extending downward proximal to the water-collecting bowl can be used in place of a separate actuating means. For ease of this disclosure, the actuating lever, the elongated valve pin and the other actuating devices suitable for this invention all will be referred to as the actuating means in this specification.

As the valve pin that serves for actually opening and closing the drinking valve is assigned a starter body, this facilitates the actuation, namely the opening and closing, of the drinking valve. Specifically, when the level of water in the water-collecting bowl falls to a certain level, the starter body pivots the actuating means, which in turn actuates the drinking valve allowing water to flow out of the drinking valve and become available for the animal. Preferably, the actuating means can be moved without direct contact between the animal and the actuating means. This invention allows chicks in particular, and even more particularly turkey chicks, to automatically obtain the water they require to a reliable extent from the drinking trough. The actuating means and the starter body makes it easier to ensure that there is adequate water for small animals in the drinking trough.

The actuating means and the starter body are preferably assigned to the valve pin of the respective drinking valve such that, by virtue of the actuating means being moved by the starter body, the valve pin can be moved into a position in which it allows water to be discharged from the water-supply line. In one embodiment of the invention, the actuating means may be configured to be larger (longer and/or of a greater diameter) than the valve pin, which usually only has a short actuating end projecting out of the housing of the drinking valve. In another embodiment of the invention, the actuating means may be an extension of the valve pin itself, such as a hollow or solid rod or other structure attached to the valve pin. In still another embodiment of the invention, the valve pin itself is long enough to serve as an actuating means. In these embodiments, the actuating means may form a kind of lever, which is easier to reach for the animals, in particular small turkey chicks, so as to allow easier movement of the valve pin, and to allow other objects within the water-collecting bowl, such as the starter body, to functionally interact with the valve pin. It is then sufficient in practice, for the purpose of opening the drinking valve, either for the animal to touch the actuating means preferably by way of their beak, bill, or head, or if the water level is reduced sufficiently to allow the starter body to pivot the actuating means, in order to move the valve pin into a position in which the drinking valve is opened, that is to say in which the outflow of water is released.

The actuating means can be pivoted about a fixed pivot pin that runs horizontally and is arranged transversely to the longitudinal axis of a horizontally arranged elongate water-supply line. The actuating means, which extends generally vertically downward relative to the water-supply line, can be pivoted in this way allows the drinking valve to be opened particularly easily. By virtue of the horizontally directed arrangement of the pivot pin transversely to the longitudinal direction of the water supply line, the actuating means can only be pivoted in opposite directions along an axis running longitudinally in relation to the water-supply line. Longitudinal vibration of the water-supply line makes it possible, on account of this specific arrangement of the pivot pin, for the actuating means to pass automatically, namely as a result of gravitational force, into a position in which the drinking valve is opened. In the case of newly housed chicks, in particular turkey chicks, this makes it possible to fill simultaneously all water-collecting bowls immovably attached to the water supply line with a certain supply of water, thereby enticing the chicks to the drinking trough.

According to one embodiment of the invention, the pivot pin about which the actuating means can be pivoted is an integral constituent part of a mount, in particular of a clamping mount, by way of which the actuating means can be coupled to the water-supply line or also the drinking valve, or a mount of the valve, can be coupled to the water-supply line. The mount, which is preferably of releasable design, makes it possible for the actuating means to be removed, if required for replacement purposes, but in particular also when the poultry house is populated with older, stronger animals that can open and close the drinking valves without the actuating means and can use the actuation of the drinking valve for reducing aggression. Such animals can possibly open the drinking valve further than is possible by the actuating means, with the result that, by virtue of the actuating means being removed, the water requirements of the animals, which increase as time progresses, can better be covered.

The actuating means may be designed as an actuating lever that has an elongate tube. Through this tube, liquid, in particular water, discharged by the drinking valve can pass specifically into the immovable water-collecting bowl. The tube directs the water from the drinking valve into the water-collecting bowl which is arranged below it and immovable with respect to the drinking valve, with the result that splashing of water is reliably avoided and it is no longer possible for the associated disadvantages to arise. For this purpose, the tube is preferably guided from the underside of the drinking valve into the vicinity of the base of the water-collecting bowl, which is preferably arranged vertically in a drinking valve. This makes it possible for a top end of the tube to be coupled to the actuating end of the valve pin of the drinking valve, said actuating end projecting downwards out of the housing of the drinking valve. As a result, when the actuating means is pivoted, the valve pin is also pivoted and the drinking valve is thus opened, with the resultant flow of water flowing downwardly inside the elongate tube into the water-collecting bowl.

The actuating means also may be designed as an extension of the valve pin. In this design, liquid, in particular water, discharged by the drinking valve also can pass specifically into the immovable water-collecting bowl. The water flows down the outside surface of the elongated valve pin from the drinking valve into the water-collecting bowl which is arranged below it and immovable with respect to the drinking valve, with the result that splashing of water also is reliably avoided and it is no longer possible for the associated disadvantages to arise. For this purpose, the elongated valve pin is preferably guided from the underside of the drinking valve into the vicinity of the base of the water-collecting bowl, which is preferably arranged vertically in a drinking valve. As a result, when the elongated valve pin is pivoted the drinking valve is thus opened, with the resultant flow of water flowing downwardly on the outside surface of the elongated valve pin into the water-collecting bowl.

The bottom end of the actuating means, said end being guided into the vicinity of the base of the water-collecting bowl, may serve to limit the pivoting angle of the actuating means because the water bowl is immovable relative to the actuating means, that is does not move with the movement of the actuating means because the water-collecting bowl is arranged in a fixed position below the water-supply line. This makes it possible to set the opening degree of the drinking valve in a measured manner. It is then only still possible for a certain quantity of liquid to pass out of the drinking valve per unit of time, as a result of which the risk of the water-collecting bowl overflowing is effectively avoided. If appropriate, the actuating means may be designed such that it can be shortened, for example by axial displacement, and the quantity of drinking water passing out of the drinking valve per unit of time can be changed, if required, for adaptation to the water requirement depending on the age of the animals.

The starter body may be any object with a density less than that of water and capable of fitting within the confines of the water-collecting bowl. Preferably, the starter body is shaped as a spherical object, but it is contemplated that the starter body could have a shape other than a spherical object, such as cubes or other polyhedrons, ovaloids, and the like. When the water-collecting bowl is filled or nearly filled with water the starter body floats and does not actuate the actuating means of drinking valve pin. As the water level drops in the water-collecting bowl by virtue of consumption, evaporation or spillage, the starter body drops with the water level. As the water level continues to drop, the starter body moves closer toward the actuating means due to the sloped bottom of the water-collecting bowl. Eventually the starter body will touch and displace the actuating means from its neutral or non-actuated (vertical) position, actuating the drinking valve, causing water to flow out of the drinking valve, through or along the actuating means and into the water-collecting bowl, thus refilling the water-collecting bowl. As the water fills the water-collecting bowl, the starter body begins to float and can move or be moved away from the actuating means, which allows the actuating means to close the flow of water.

In one preferred configuration of the drinking trough, the actuating means has a pivotable design. The actuating means may be exclusively attached to the valve pin and freely pivotable about the natural pivot point of the valve pin such that the elongated actuating means may explore a cone shaped region of space. The actuating means may be pivoted in this way to allow the starter body to approach the actuating means from any direction as the water level drops within the water-collecting bowl. Thus, the starter body may float freely around the actuating means when the bowl is full and functionally interact with the actuating means when the water-collecting bowl empty or almost empty.

In another preferred configuration of the drinking trough, the cross-sectional shapes of the water-accommodating hollow change along with the water level. By virtue of the changing cross-sectional shape or configuration, which changes as the water level in the water-accommodating hollow changes, it is possible for the cross-sectional surface area of the water-accommodating hollow to increase disproportionately with the water level. As a result, as the water level, for example, doubles, the water-accommodating hollow can accommodate more than double the quantity of water. This has the advantage for turkeys in particular, and more particularly turkey chicks, which are not yet sufficiently familiar with the actuation of the drinking trough, that, with the water-collecting bowl full, they can obtain the water they require without having to open the drinking valve by, for example, the actuating means. Further, if the water level in the water-collecting bowl decreases, starter body will pivot the actuating means and the water-collecting bowl will be refilled. Opening of the drinking valve in this manner takes place, as it were, inevitably or automatically, without the animals intending, or even noticing, it. In this way, there is more or less no need at all for newly housed chicks to become accustomed to the drinking trough, because the drinking valve is opened whenever the animals try to pick up the rest of the water from the water-collecting bowl, that is, when the water level in the water-collecting bowl falls below a certain level.

The water-accommodating hollow can be designed such that it has an approximately circular cross section in the vicinity of its base, said circular cross section running concentrically in relation to the preferably likewise circular cross section of the actuating means. Said circular cross section in the base region of the water-accommodating hollow gradually changes, as the distance from the base region increases, into a differently shaped cross section, such as an elliptical or oval cross section. In this case, the ratio of the long axis to the short axis of the elliptical or oval cross section increases in the direction of the top border of the water-accommodating hollow. In this way, the water-accommodating hollow, in the direction of the top border, achieves a comparatively elongate configuration, which provides the top region of the water-accommodating hollow with a comparatively large water-accommodating capacity. In this embodiment, the water-accommodating hollow achieves an approximately boat-like, elongate form and can be arranged in a specific manner relative to the water-supply line. Accordingly, the elongate water-accommodating hollow is oriented longitudinally in relation to the water-supply line such that the longitudinal center axis of the water-accommodating hollow runs parallel to the longitudinal center axis of the water-supply line, the longitudinal center axis of the water-accommodating hollow preferably coinciding with an imaginary vertical plane that runs through the longitudinal center axes of the water-supply line and of the drinking valves connected thereto. In this way, the water-collecting bowl is located predominantly beneath the water-supply line, as a result of which the water-collecting bowl is also effectively protected against, in particular, the water located therein being contaminated. The elongate shape of the water-collecting bowl also allows self-cleaning of the same by the plumage of the animals.

Moreover, the disproportionately large increase in the volume of the water-accommodating hollow in the direction of the top border (edge or rim) of the water-accommodating hollow results in an overflow of the water-collecting bowl being avoided because, for this purpose, the animals would have to keep the drinking valve open for a comparatively long period of time, which, as experience has shown, does not occur because the animals only come into contact with the actuating means or the actuating lever for a brief period. In addition, an overflow of the water-collecting bowl is prevented in that, by virtue of the specific configuration of the water-accommodating hollow according to the invention, the surface area of the water located in said hollow increases as the water rises increasingly, and thus moves away from the actuating lever, with the result that the animals are very much distracted from the actuating lever over time and thus no longer actuate the automatically closing drinking valve.

This invention also includes a method for activating a watering valve of a drinking trough. More particularly, this method comprises the steps of providing a drinking trough with at least one actuating means extending downward from a valve into a water-accommodating hollow of a water-collecting bowl, providing a starter body that floats upwards and downwards along with the rising and falling level of water in the water-collecting bowl, and actuating the actuating means by displacement by the starter body in the water collecting bowl. The starter body is capable of displacing the at least one actuating means, thus actuating the actuating means when the water level in the water-accommodating hollow is sufficiently low. Displacing the actuating means releases water from the water source, typically a pressured water source in fluidic connection with the watering valve, into the water-collecting bowl.

Another embodiment of the method of this invention is a method of converting a drinking trough that has at least one drinking valve, which is connected to a water-supply line, and at least one water-collecting bowl assigned to the drinking valve, characterized in that, once the animals have reached a certain age, a water-collecting bowl with a limited water-accommodating capacity that is provided for young animals is exchanged for a water-collecting bowl with a greater water-accommodating capacity. Accordingly, the drinking trough can be converted by virtue of the water-collecting bowls being exchanged. Thus, as the animals become older and they require more water, the water-collecting bowls with a smaller water-accommodating capacity are exchanged for water-accommodating bowls with a greater water-accommodating capacity. This exchange can be carried out quickly and easily by the releasable fastening of the water-collecting bowls on, in particular, the water-supply line. All other components of the drinking trough, in particular the drinking valves, need not be changed. It also is preferable for the quantity of water passing out of the drinking valve per unit of time to be changed at the same time as the water-collecting bowl is exchanged.

Alternatively, it is also possible for the drinking trough to be converted by the actuating lever, which is preferably releasably connected to the water-supply line or the respective drinking valve, being removed. Larger animals can then actuate the valve pin of the drinking valve directly, to be precise to the extent where it discharges larger quantities of water per unit of time than is possible if the drinking valve is opened by the actuating lever.

These features, and other features and advantages of the present invention will become more apparent to those of ordinary skill in the relevant art when the following detailed description of the preferred embodiments is read in conjunction with the appended drawings in which like reference numerals represent like components throughout the several views.

DETAILED DESCRIPTION OF THE PREFERRED EMBODIMENTS

Figure 1:
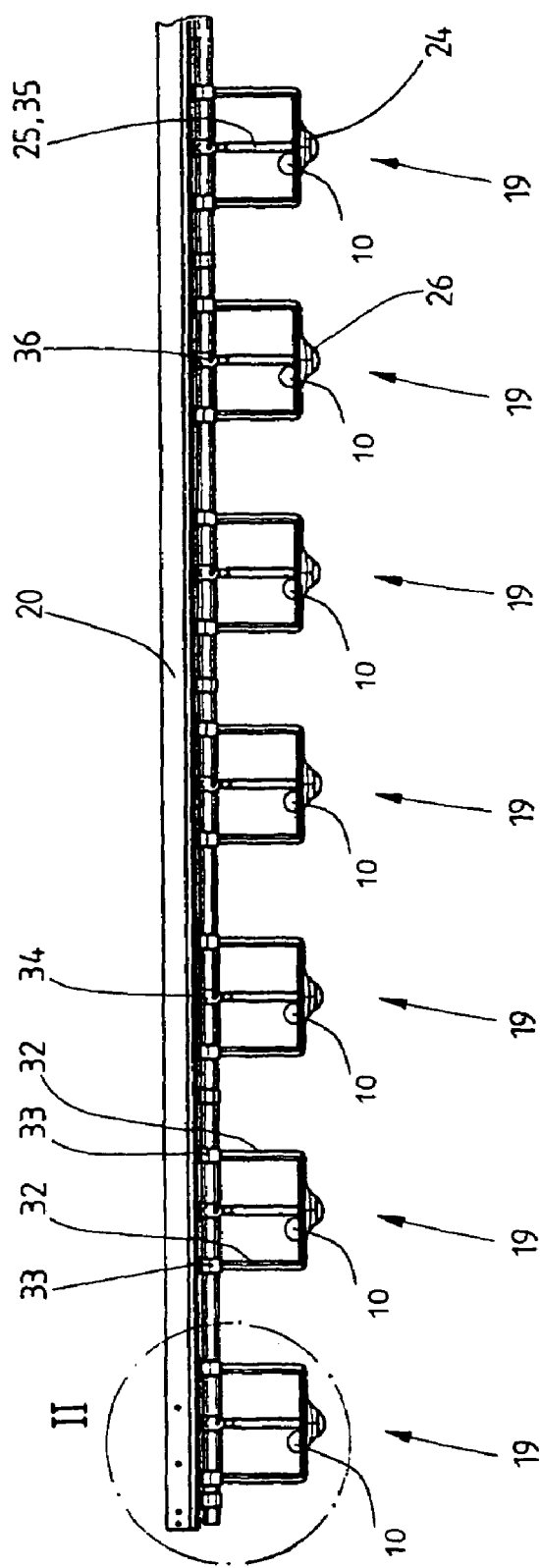
FIG. 1 shows a side view of part of the drinking trough (drinking element).

The drinking trough shown here is designed as an in-line drinking trough for the free-range management of poultry. The drinking trough allows all types of poultry, in particular also young animals such as chicks, to obtain automatically the water they require. The drinking trough according to the invention is also suitable, in particular, for turkeys and turkey chicks.

The drinking trough shown in FIGS. 1 to 6 has an elongate, tubular water-supply line 20 with a plurality of spaced-apart drinking locations (stations) 19, generally all of the same design. The water-supply line 20 is arranged in a horizontally directed manner, on support cables (not shown), in a poultry house at an appropriate distance from the ground, in a known manner. In the case of the drinking trough shown here, drinking valves 21 are screwed into the water-supply line 20 from beneath at regular intervals. These are drinking valves 21 that are known per se and have a partially externally threaded housing for screwing into corresponding threaded bores of the water-supply line 20. The drinking valves 21, which are preferably of the same design as one another, have a valve pin that projects out of the housing 22 at the bottom by way of an actuating end 23. The respective drinking valve 21 can be opened by the valve pin being actuated, such as for example by the animal or by the starter body 10 from the actuating end 23. As a result water fed to the drinking valves 21 from the water-supply line 20 can flow out of the drinking valves 21 at the bottom in measured quantities. If actuation of the valve pin ceases, the drinking valve 21 closes automatically, as a result of which further flow of water out of the drinking valve 21 is interrupted.

Each drinking valve 21 is assigned a water-collecting bowl 24 and each water-collecting bowl 24 is assigned a starter body 10. The water-collecting bowls 24 of all the drinking locations 19 are arranged centrally at a distance beneath the drinking valves 21. In the exemplary embodiment shown, the water-collecting bowls 24 are connected releasably to the water-supply line 20 while being stationary and immovable. Furthermore, each drinking valve 21 is assigned an actuating means designed as, for example, a tubular actuating lever 25 or as a rod-like actuating lever 50 that may be actuated by the starter body 10 assigned to the respective water-collecting bowl 24. The water-collecting bowl 24 and the starter body 10 are designed so that the starter body 10 floats on or near the surface of the water in the water-collecting bowl 24 without actuating the actuating lever 25 when the water in the water-collecting bowl 24 is plentiful and actuates the actuating lever 25 when the water-collecting bowl 24 is partially or completely empty.

More particularly, the actuating lever 25, 50 relative to the respective water-collecting bowl 24 is mounted pivotably on or in the region of the water-supply line 20 and, in a top region, is coupled to the actuating end 23 of the valve pin of each drinking valve 21. The actuating lever 25, 50 is guided from the respective drinking valve 21 into the water-collecting bowl 24 and thus, in practice, extends the actuating end 23 of each valve pin into the region of the water-collecting bowl 24. By virtue of the fixed arrangement of each water-collecting bowl 24 to the water-supply line 20 only the actuating lever 25, 50 can be pivoted, but not its respectively assigned water-collecting bowl 24.

According to the invention, the water-collecting bowl 24, which is illustrated in more detail in FIGS. 5 to 13, is designed particularly for supplying water to small, young animals, and, in a preferred embodiment, the breeding of turkey chicks. Supplying water automatically to turkey chicks by drinking troughs of the type described here has proven very problematic up until now because the turkey chicks are timid and are not quick to learn. The specific configuration of the water-collecting bowl 24, to be precise in particular the water-accommodating hollow 26 of the same which serves for accommodating a water supply and the starter body 10, has proven practicable for supplying water automatically to turkey chicks.

In one embodiment, the actuating lever 25, which preferably is formed entirely from plastic, preferably a thermoplastic material, has a top articulation part 34 and a tube 35 arranged therebeneath. The articulation part 34 and the tube 35 are connected integrally to one another. The actuating lever 25 is connected to the water-supply line 20 by way of the articulation part 34 such that it can be moved about a horizontal pivot pin 36. The pivot pin 36 runs transversely to the longitudinal axis of the water-supply line 20. Moreover, the pivot pin 36 runs transversely through the vertical longitudinal center axis of the drinking valve 21 of each drinking location 19. In the exemplary embodiment shown in FIG. 2, the pivot pin 36 is located some way beneath the longitudinal center axis of the water-supply line 20, generally approximately level with an underside of water-supply line 20. In this way, the actuating lever 25 can only be pivoted in opposite directions along a vertical plane extending centrally through the water-supply line 20. In other directions, the actuating lever 25 is essentially immovable. The articulation part 34 of the actuating lever 25 is of fork-like design with an essentially U-shaped cross section. Two parallel, upright legs 37 of the articulation part 34 are located on opposite sides of the water-supply line 20. Each of these legs 37 has a through-passage bore 38. The through-passage bores 38 of the two legs 27 are located on a common axis that corresponds to the pivot pin 36.

Figure 2:
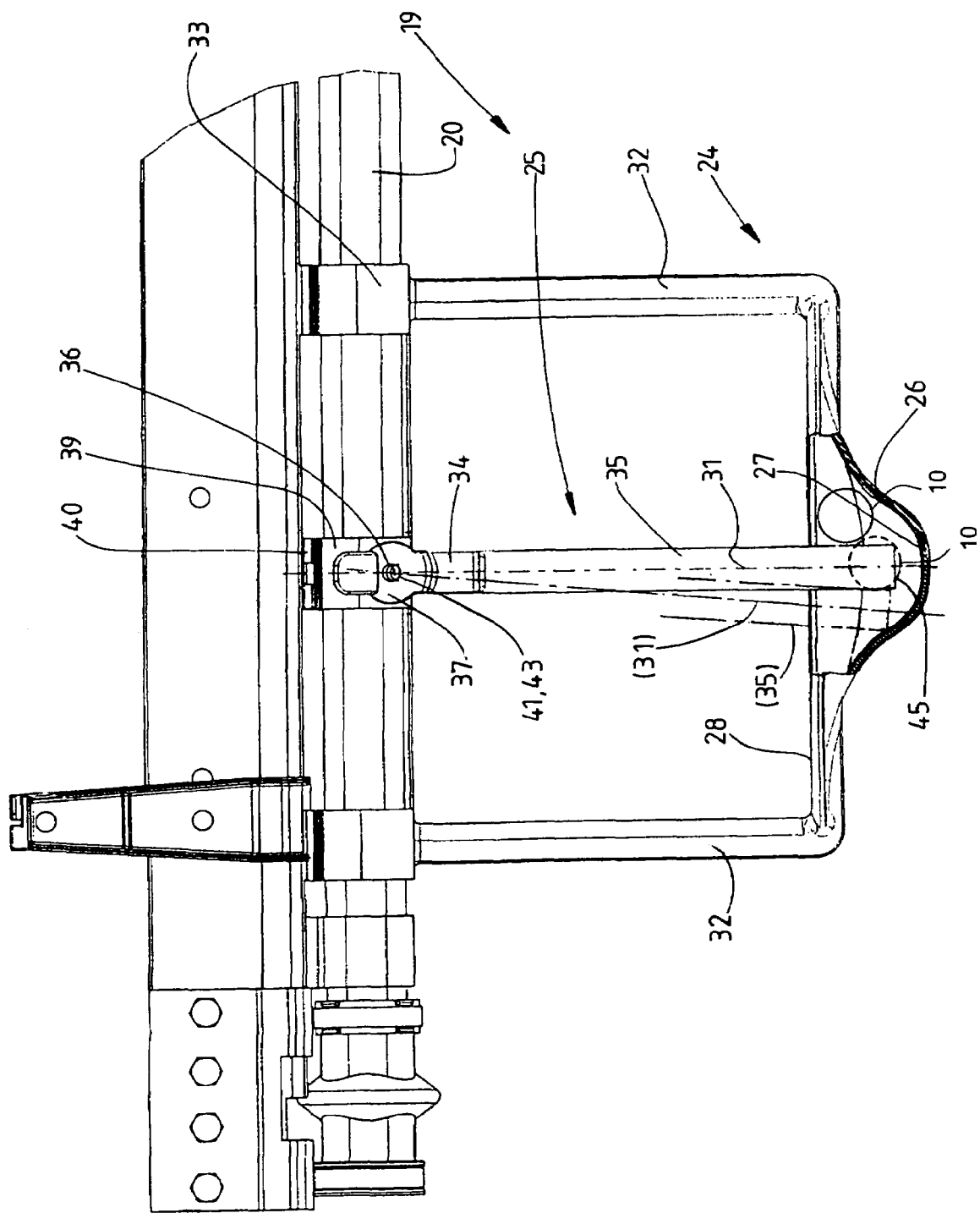
FIG. 2 shows an enlarged detail 11 of the drinking trough from FIG. 1 in a partial section.

In the exemplary embodiment shown in FIG. 2, a fastening part 39 is provided in the region of the respective drinking valve 21, said fastening part enclosing the water-supply line 20 in a clamp-like manner and being releasable from the water-supply line 20, if required, by a clip closure 40. The fastening part 39 has journals 41 that project on opposite sides and, like the through-passage bores 38 of the articulation part 34 of the actuating lever 25, are located on the pivot pin 36. The through-passage bores 38 are designed to correspond to the journals 41 such that the journals 41 engage in the respective through-passage bore 38 at least in part from one side, and a connection of the actuating lever 25 to the fastening part 39 and, via the latter, to the water-supply line 20 is thus produced. Furthermore, the through-passage bores 38 and the journals 41 are dimensioned such that they allow easy, constraint-free pivoting of the actuating lever 25. By virtue of the legs 37 being designed in an elastic manner, the journals 41 of the fastening part 39 can be connected to the through-passage bores 38 of the articulation part 34 and disconnected therefrom by latching. This creates a releasable articulated connection between the actuating lever 25 and the water-supply line 20 or the fastening part 39, and this connection allows the actuating lever 25 to be fitted and removed quickly and easily.

The articulation part 34 and the tube 35 are connected in the region of a crosspiece 42 between the legs 37 of the articulation part 34. The crosspiece 42 has a central through-passage bore 43, which leaves the top end of the tube 35 open for the through-flow of water. The actuating lever 25 is coupled to the actuating end 23 of the valve pin of the drinking valve 21 in the region of the through-passage bore 43 of the crosspiece 42. For this purpose, certain regions of the through-passage bore 43 in the crosspiece 42 are provided with, for example, radially directed ribs 44 (only one rib 44 is shown, for illustrative reasons, in FIG. 3A). By means of at least three such ribs 44 arranged in the form of a star, the actuating lever 25 is coupled in a more or less form-fitting manner to the actuating end 23 of the drinking valve 21. In the case of the actuating lever 25 being pivoted, such as by the starter body 10, the actuating end 23 is thus pivoted along with it and the drinking valve 21 is opened as a result. The drinking valve 21 remains open until the actuating lever 25 is pivoted (chain-dotted illustration in FIG. 2). Once the actuating lever 25 is released, such as when the water-collecting bowl 24 fills with water and the starter body 10 floats upwards and away from the activating lever 25, the activating lever 25 returns automatically, as a result of gravitational force, into its vertical starter position (FIG. 2), as a result of which the drinking valve 21 passes into its closed position again. Free spaces remaining between the ribs 44 of the through-passage bore 43 in the crosspiece 42 ensure, when the drinking valve 21 is open, that the water flowing out of the latter flows through the tube 35 to the stationary water-collecting bowl 24.

The length of the actuating lever 25, in particular of the tube 35, is such that an open, bottom end 45 of the tube 35 ends at a small distance above the lowest location 27 on the base of the water-accommodating hollow 26 (FIG. 2). This distance is preferably selected such that it is only possible for the actuating lever 25 to be pivoted to a certain extent (the pivoting angle) with respect to the non-pivotable water-collecting bowl 24. This makes it possible, via the corresponding design of the water-accommodating hollow 26 of the water-collecting bowl 24 and its stationary arrangement below the water-supply line 20, to limit the quantity of water discharged by the drinking valve 21. Commercially available drinking valves 21 with a large water through-flow rate that covers the water requirement of larger animals may thus be used for breeding young animals, in particular turkey chicks, without any risk of the water-collecting bowl 24 overflowing. Specifically, tube 35 can only be pivoted a certain distance before it contacts the sloped side of water-collecting bowl 24 and stops, thus allowing valve pin to open only a certain distance and allowing only a certain water flow rate through valve pin.

The color of the actuating lever 25 preferably differs from, and is lighter than, that of the water-collecting bowl 24. For example, the actuating lever 25 may be yellow. The yellow color, in particular if a signal yellow is used, has a certain enticing effect for the animals, which results in newly housed, inexperienced chicks, in particular turkey chicks, being able to open the respective drinking valve 21 more or less playfully when they touch the actuating lever 25 out of curiosity, said actuating lever, on account of its smooth operation, thus opening the drinking valve 21.

Figure 3A:
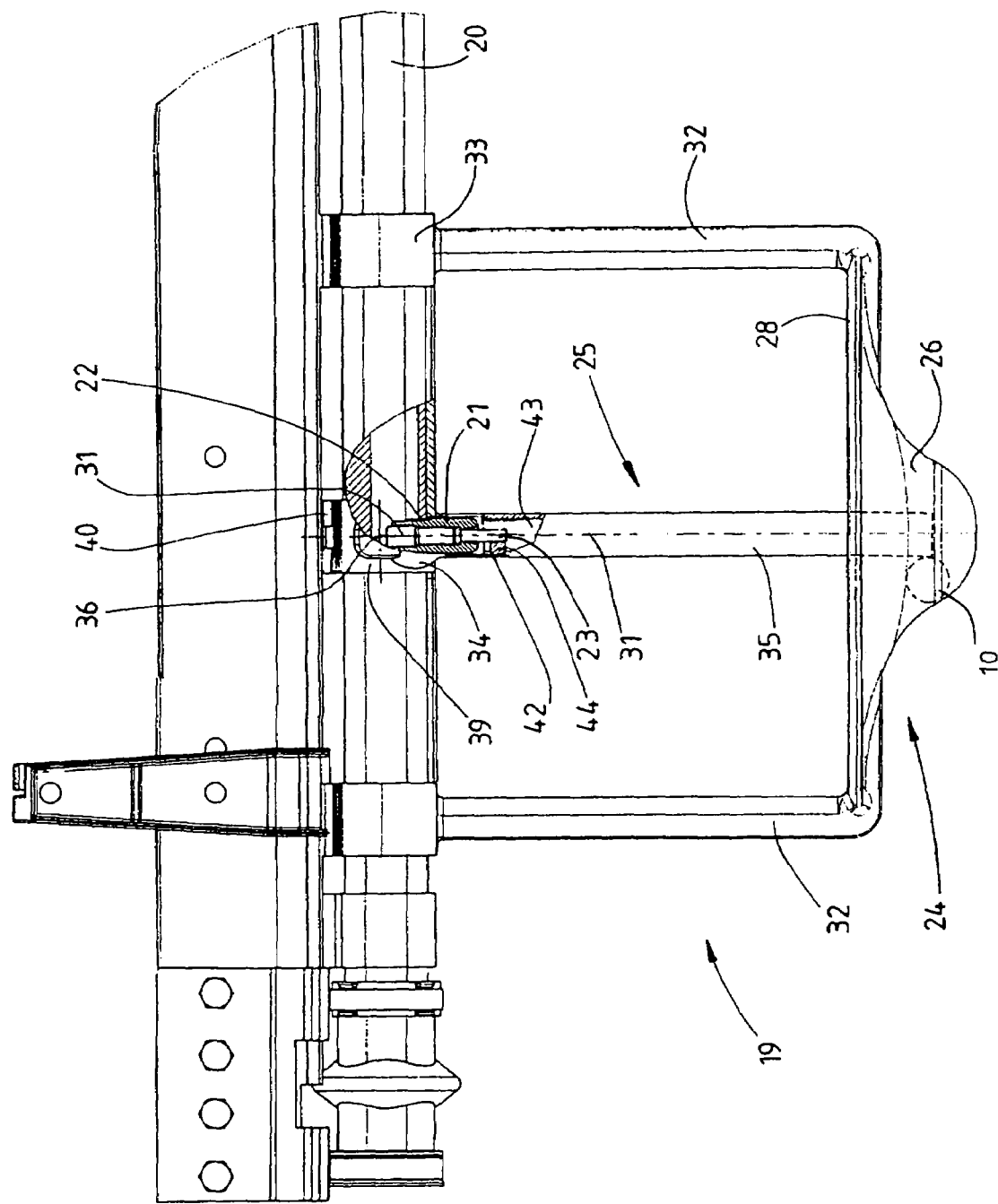
FIG. 3A shows an illustration of the drinking trough analogous to FIG. 2 in another partial section in which the actuating means is a separate tubular member attached to the valve pin.
Figure 3B:
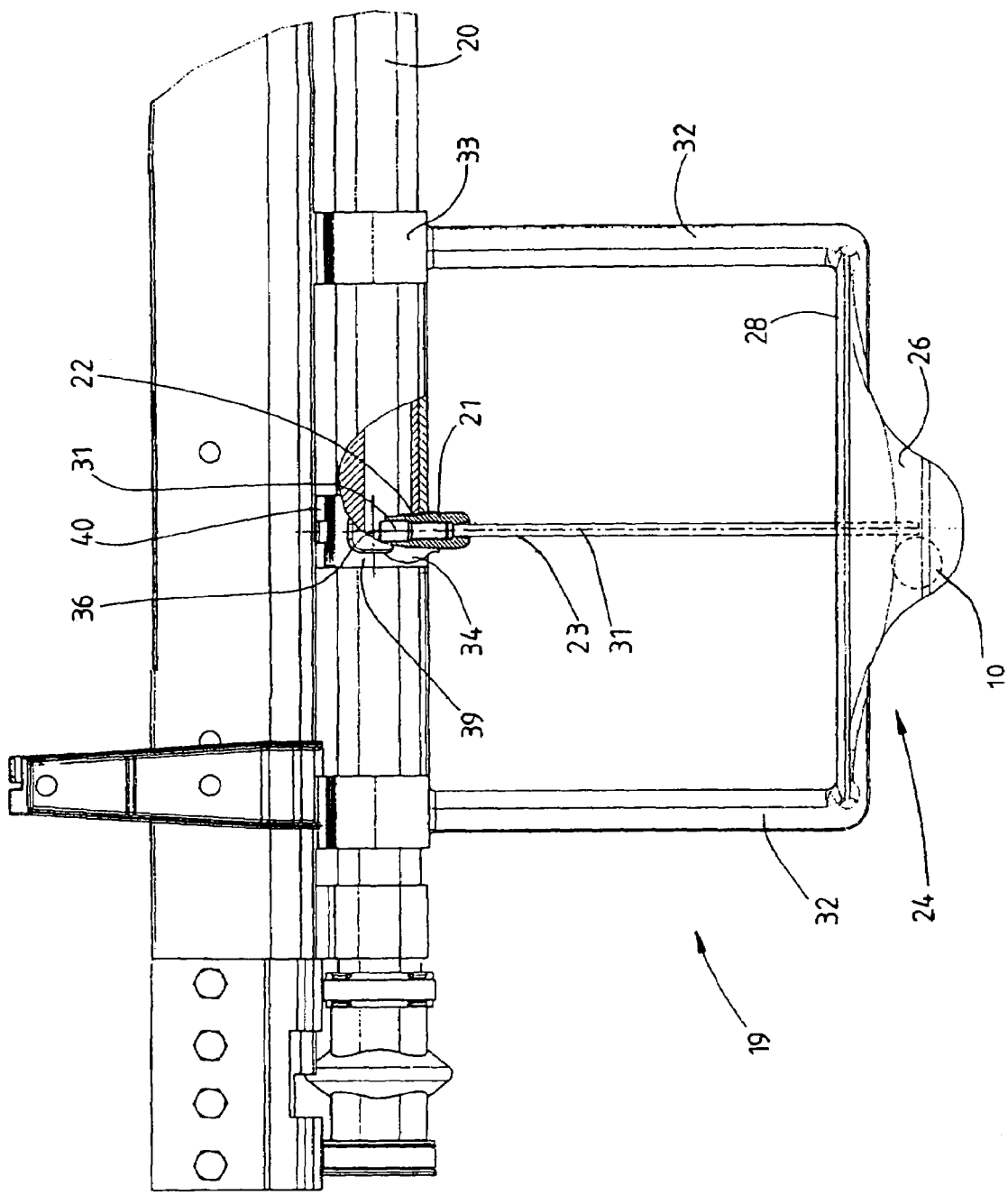
FIG. 3B shows an illustration of the drinking trough analogous to FIG. 2 in another partial section in which the actuating means is an elongated valve pin.
Figure 4:
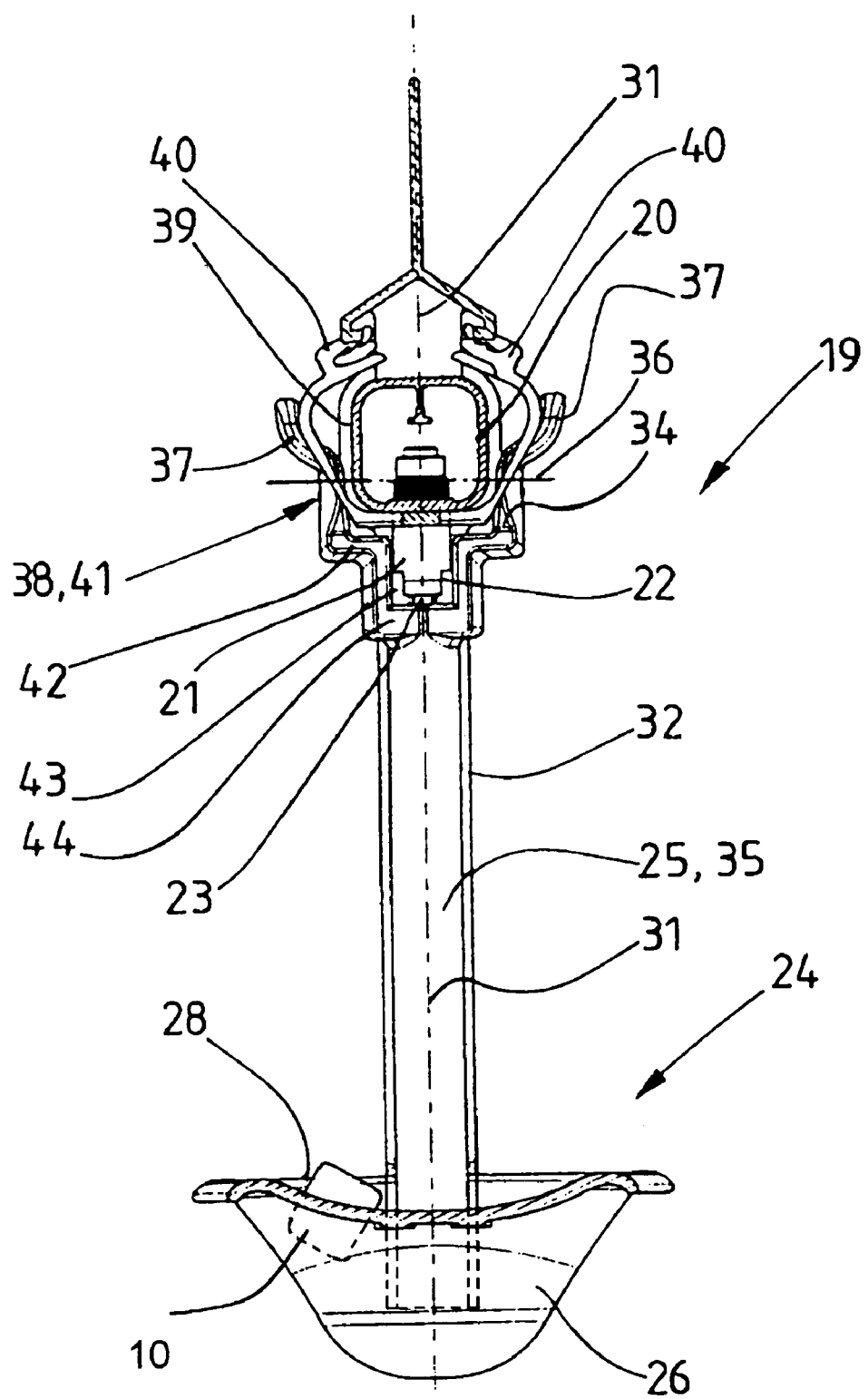
FIG. 4 shows a cross section through the drinking trough of FIG. 1 and illustrates a starter body having a cuboid shape with rounded edges.

FIG. 3B illustrates an embodiment of the invention in which the actuating means is an elongated valve pin. More particularly, the actuating end 23 of the valve pin is elongated and extends from the valve 21 to the water-collecting bowl 24. More specifically, when the actuating end 23 of the valve pin is pivoted the drinking valve 21 is thus opened. The length of the actuating end 23 of the valve pin is such that the latter ends, by way of a free (bottom) end, at a small distance above the lowest location 27 on the base of the non-pivotable water-accommodating hollow 26. The elongated valve pin can be moved all the way around, that is to say it can be pivoted as desired in all directions. In this case, the pivoting angle of the elongated valve pin is limited by a stop of the bottom free end on the stationary water-accommodating hollow 26 of the water-collecting bowl 24 attached below the water-supply line 20. In this configuration a separate actuating lever 25 is not necessary. If the drinking valve 21 has been opened by virtue of the actuating end 23 of the valve pin being pivoted by the starter body 10, the water passing out of the drinking valve 21 at the bottom flows along the outside of the valve pin into the water-accommodating hollow 26 of the water-collecting bowl 24, which is immovable relative to the valve pin. In this case, the water adheres by adhesion to the outer lateral surface of the valve pin, with the result that all the water passes into the water-collecting bowl 24 and does not splash about.

Figure 5:
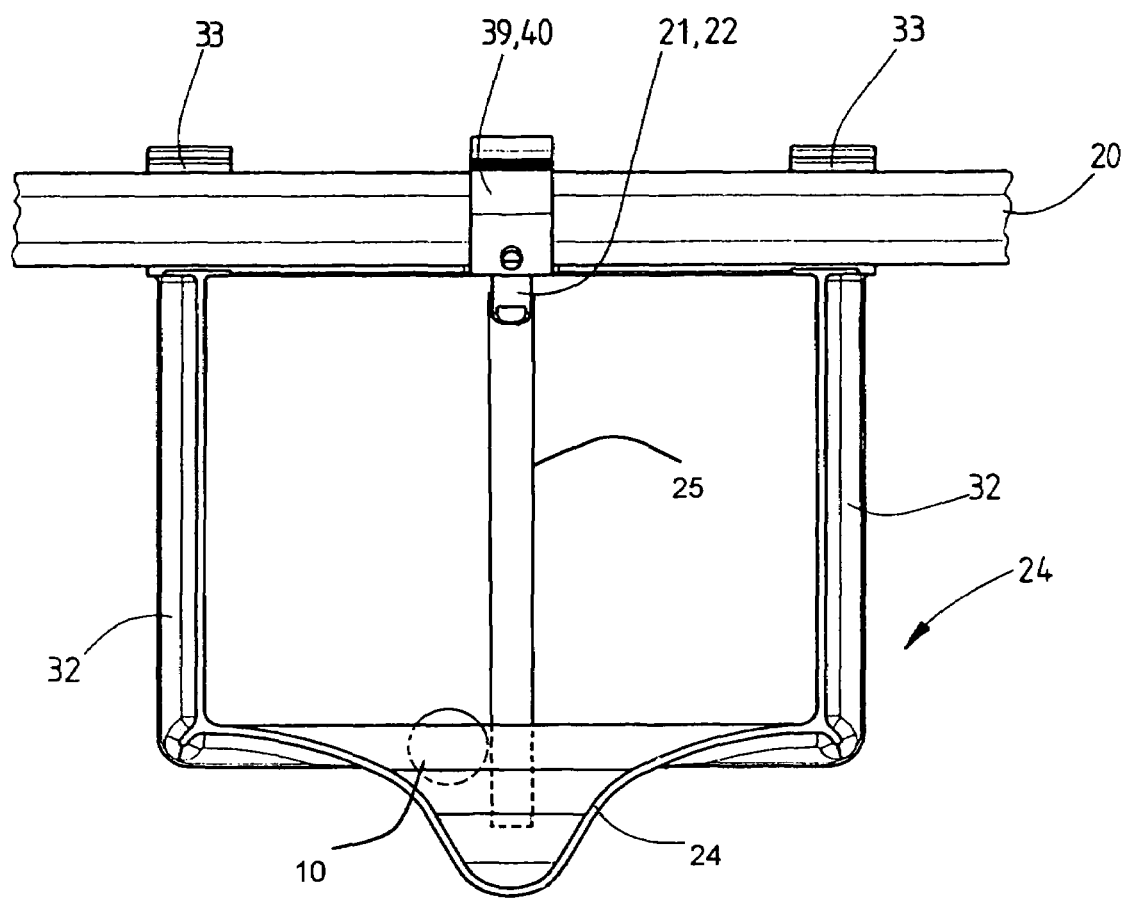
FIG. 5 shows side view of part of a drinking trough with the starter body in an empty water-collecting bowl.

FIG. 5 shows the drinking valve 21 in a closed configuration in which the actuating lever 25 is not actuated by the starter body 10. The drinking valve 21 is in a closed configuration when the water-collecting bowl 24 contains a sufficient amount of water and the starter body 10 is sufficiently afloat and not actuating the actuating lever 25. Because the starter body 10 is less dense than water, the starter body 10 floats upon or near the surface of the water in the water-containing bowl 24. In this closed configuration, the starter body 10 may float away from the actuating lever 25 such that the actuating lever 25 is in a non-displaced or non-pivoted position. Preferably, when water is plentiful in the water-collecting bowl 24, the starter body 10 may be moved to a side of or around the actuating lever 25 without displacing activating lever 25. Specifically, there is no pivoting action exerted against the valve pin of the drinking valve 21 and no water is dispensed from the drinking valve 21. The starter body 10 is shown in a position proximal to but not actuating the actuating lever 25 in FIG. 5. However, as the water level rises even farther in the water-collecting bowl 24, the starter body 10 can float even farther away from the actuating lever 25, such as towards the border 29 of the water-collecting bowl 24.

Figure 6:
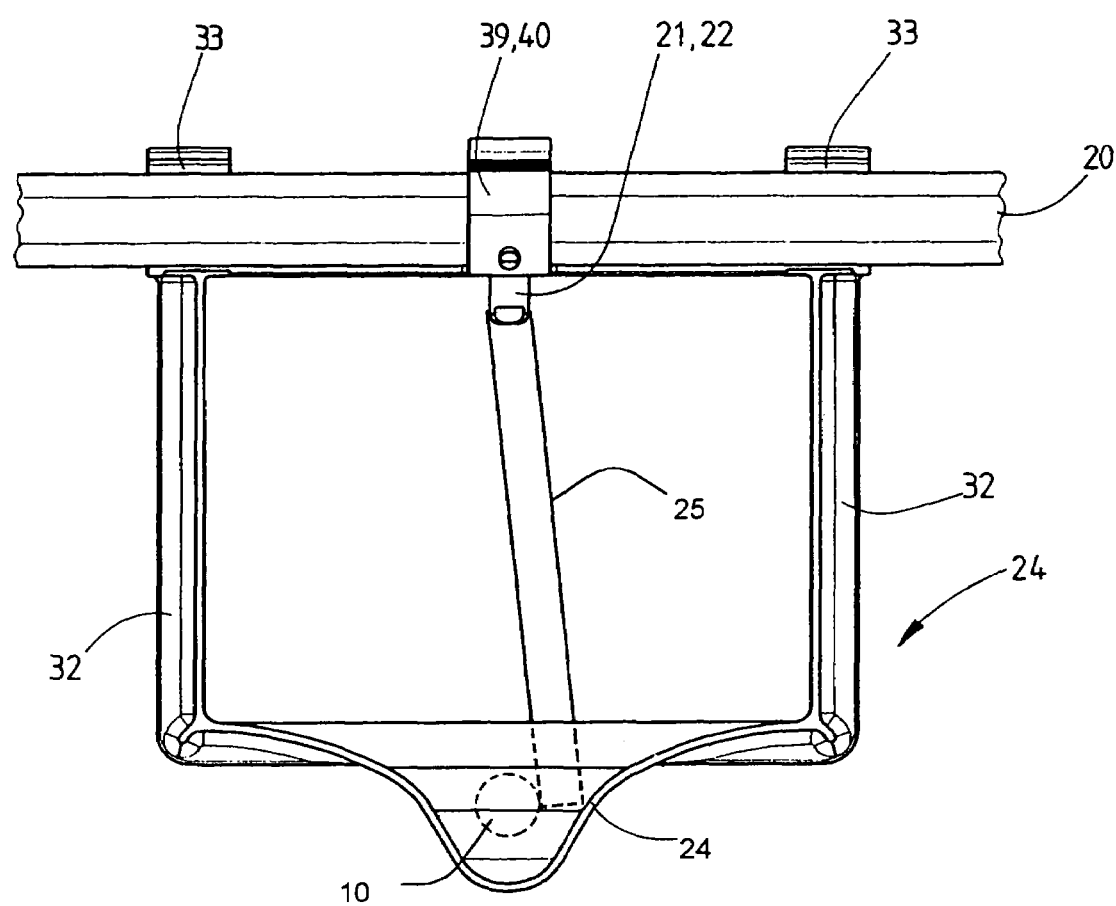
FIG. 6 shows side view of a drinking trough with the starter body in a full water-collecting bowl containing a starter body.

FIG. 6 shows the drinking valve 21 in an open configuration in which the actuating lever 25 is actuated by the starter body 10. The actuating lever 25 for opening the drinking valve 21 is pivoted by the starter body 10 as the water-collecting bowl 24 becomes empty or practically empty. Specifically, when the water level falls in the water-collecting bowl 24 by, for example, consumption or evaporation, the starter body 10 falls (is lowered by the lowering level of the water) towards the lower part of the water-collecting bowl 24 by gravity and due to the slope of the water-collecting bowl 24. That is, due to the preferred design of the water-collecting bowl 24, the starter body 10 is forced by gravity down the sloped side of the water-collecting bowl 24 by its own weight into the middle of the water-collecting bowl 24. As the starter body 10 moves into the middle of the water-collecting bowl 24, the starter body 10 comes into contact with and pivots the end of the actuating lever 25 to one side and opens the drinking valve 21. Water then is discharged from the drinking valve 21 into the water-collecting bowl 24.

As the water fills the water-collecting bowl 24, the starter body 10 again floats upwards (is raised by the rising level of the water) and can leave the middle of the water-collecting bowl 24 and can move away from the actuating lever 25 allowing the actuating lever 25 to return to a neutral position in which water is not dispensed. The starter body 10, because its density is less than that of the water, will rise from the lower part of the water-collecting bowl 24 as the water level in the water-collecting bowl 24 rises. The addition of water into the water-collecting bowl 24 provides additional buoyancy so that the starter body 10 may return to side position shown in FIG. 5. Once the starter body 10 has returned to the side position or has otherwise moved away from the actuating lever 25, the water valve 21 can return to a closed configuration. The weight of the actuating lever 25 helps to force the starter body 10 off to the side when the starter body 10 is in a free floating position when there is sufficient water in the water-collecting bowl 24.

Figure 7:
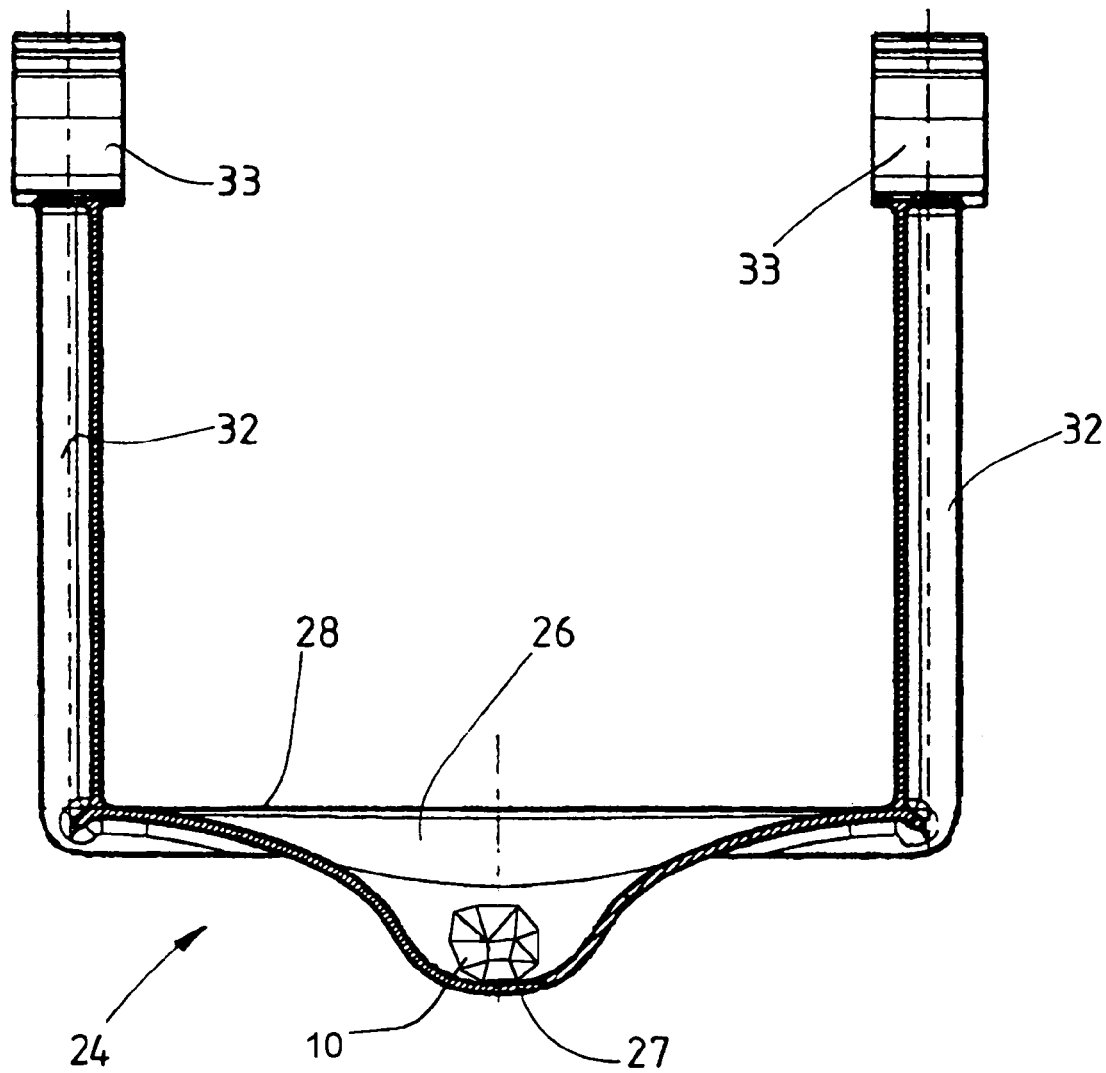
FIG. 7 shows a side view of a water-collecting bowl with a section through the center of the water-accommodating hollow and illustrates a starter body having a polyhedron shape.
Figure 8:
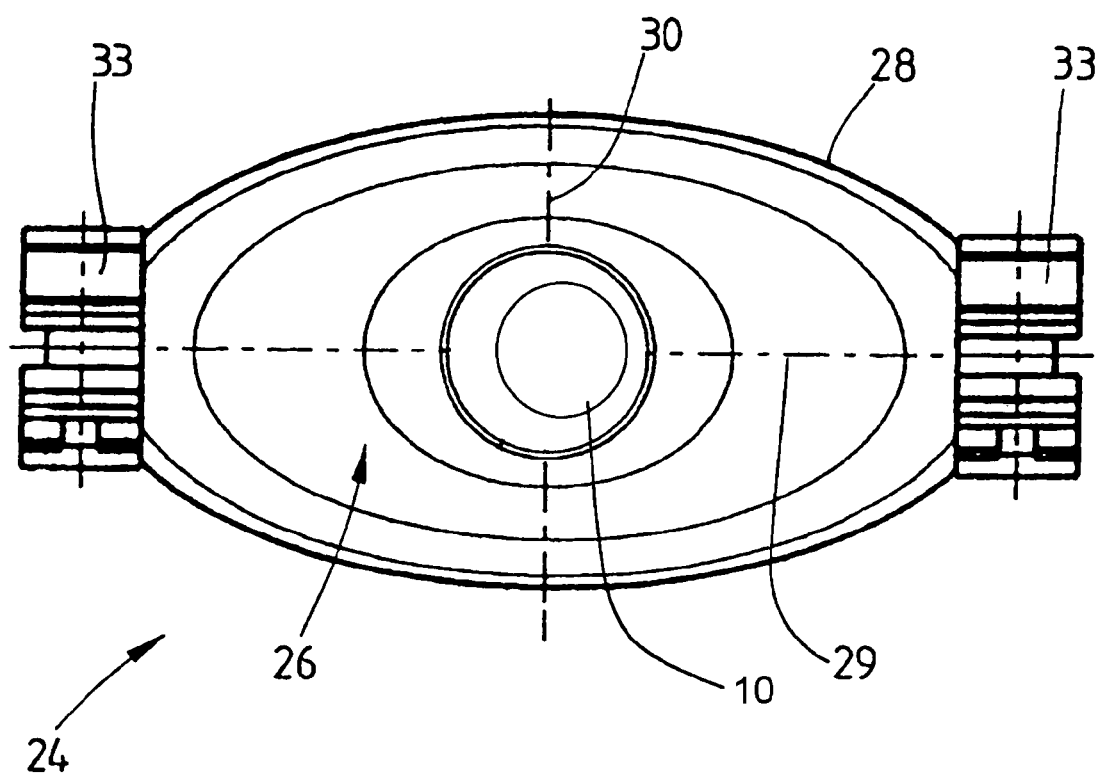
FIG. 8 shows a top sectional view of a water-collecting bowl with the starter body in center of the water-accommodating hollow.

The combination of the starter body 10 and the water-accommodating hollow 26 of the water-collecting bowl 24 shown in FIG. 8 having an elongate, boat-like configuration is able to provide a means for regulating water distribution to poultry. For this purpose, the cross-sectional configuration of the water-accommodating hollow 26 can change, preferably continuously, from the lowest location 27 in the base region up to the top border 28 (the rim or edge of the water-collecting bowl 24). Thus, as shown in FIGS. 7 and 8, a bottom part of the water-accommodating hollow 26 extending from the lowest location 27 is provided with a circular cross section. This circular cross section can change continuously in the direction of the top border 28 into an elliptical (or also oval) cross section so to help ensure that the starter body 10 rises with the water level. In this case, the ratio of the longer axis 29 to the shorter axis 30 of the elliptical cross section increases in the direction of the top border 28, that is to say the elliptic cross-sectional configuration of the water-accommodating hollow 26 becomes continuously more pronounced in the direction of the top border 28 and the starter body 10 can float further away from the actuating lever 25, thus avoiding incidental contact with the actuating lever 25 and incidental distribution of water.

The change in cross-sectional configurations of the water-accommodating hollow 26 results in not just a change in the size but also a change in the shape of the water surface of the drinking water located in the water-accommodating hollow 26 as the water level rises in the direction of the border 28. In particular the volume of the water in the water-accommodating hollow 26 increases disproportionately as the water level rises. At a low water level, there is only a comparatively small quantity of water still remaining in the water-accommodating hollow 26. At this water level, the starter body 10 rests towards the middle (center) of the water-accommodating hollow 26, against the actuating lever 25 and potentially activating the valve pin. This quantity of residual water takes up the bottom, circular part of the water-accommodating hollow 26, with the result that, at a low water level in the water-collecting bowl 24, the surface of the water-accommodating hollow 26 is circular and only extends at a small distance from the vertical longitudinal center axis 31 of the water-accommodating hollow 26, said longitudinal center axis extending the longitudinal center axis of the respective drinking valve 19 in the downward direction. If the water-accommodating hollow 26, in contrast, is filled with water more or less up to the border 28, the water surface has an elongate, elliptical configuration. The area of this water surface is greater, by a multiple, than the circular water surface area in the vicinity of the lowest location 27 of the water-accommodating hollow 26 (FIG. 8). In this way, the water volume in the water-accommodating hollow 26 with double the water level is more than double the size. Further, with a greater surface area, the starter body 10 has a greater area for floating and being distal from the actuating lever 25, reducing the potential for incidental of unnecessary activation of the valve pin.

The water-collecting bowl 24 should contain a sufficient volume of water to permit the starter body 10 to float to a position that does not exert pressure on or pivot the actuating lever 25. If the water-collecting bowl 24 is not deep enough or is not large enough to accommodate both the starter body 10 and the actuating lever 25 in a neutral position, the starter body 10 may continuously pivot the actuating lever 25, which may cause water to continuously flow from the drinking valve. If the water-collecting bowl 24 is excessively large compared to starter body 10, then the starter body 10 may float away from the center of the water-collecting bowl 24 without displacing the actuating lever 25, which may result in water not flowing from the drinking valve. One of ordinary skill in the art may construct the water-collecting bowl 24 to have a desired size based on the position of the actuating means and the size of the starter body 10.

The entire water-collecting bowl 24 can be formed in one piece from plastic, such as a thermoplastic material. Preferably, the water-collecting bowl 24 is dark in color, such as a dark blue. Such a color does not contrast with the bedding (for example shavings) in the poultry house, as a result of which the water-collecting bowl is not obvious, in particular, to young turkey chicks and thus does not form an enticement.

The starter body 10 preferably is constructed from a material less dense than water yet of sufficient density such that it can pivot actuating lever 25 and actuate the valve pin. Various plastic materials are suitable and one of ordinary skill in the art can choose a suitable material without undue experimentation. The starter body 10 preferably is of a size and shape that it can comfortably fit within the water-collecting bowl 25 without taking up too much space and/or reducing significantly the amount of water that can be contained in the water-collecting bowl 25. For example, when using the typical water-collecting bowl 25 having a maximum water level of approximately 30 mm, the starter body 10 can weigh in the range of 5 g to 10 g, and preferably approximately 7.5 g, and have a diameter or equivalent in the range of 15 mm to 35 mm, preferably in the range of 20 mm to 30 mm, and preferably approximately 25 mm. The starter body 10 can be of any shape, such as for illustrative purposes spherical, ovaloid or polyhedron.

The starter body 10 preferably is constructed from a plastic material with a color that also does not contrast with the bedding or the water-collecting bowl 24. Preferably, the starter body 10 is of an inexpensive plastic material of a color chosen to minimize its attractiveness to the animals. The starter body 10 could be same color as the water-collecting bowl 24 so that the starter body 10 does not contrast with the water-collecting bowl 46, which may minimizing any potential attractions of the young chicks to the starter body 10. Further, the starter body 10 can be attached to the water-collecting bowl 24 or another part of the drinking system in such a manner to prevent the starter body 10 from falling out of the water-collecting bowl 24, or being pushed out of the water-collecting bowl 24 by the animals. A small link chain or a monofilament or the like is suitable for such a purpose.

Figure 9A:
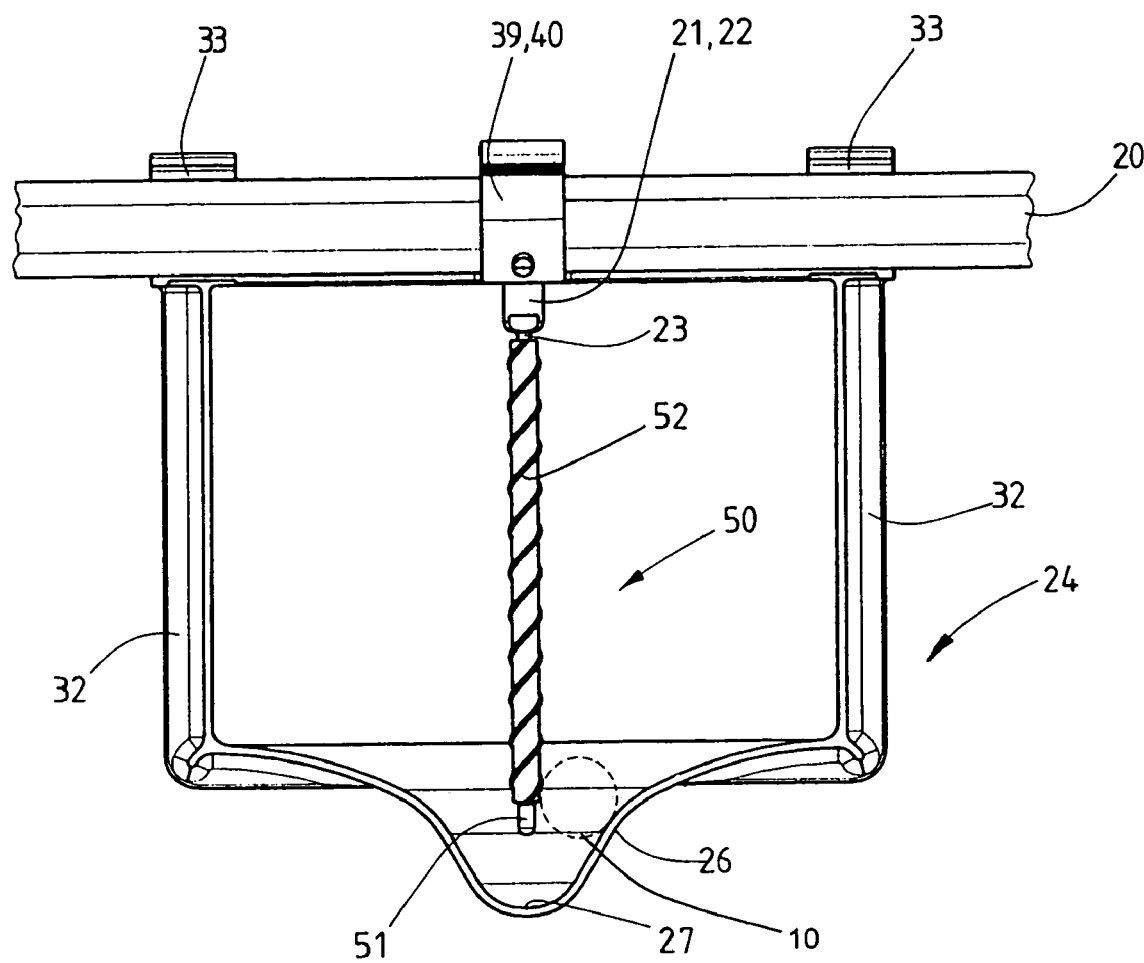
FIG. 9A shows an alternative drinking trough with a rod-like actuating means in a partial section.

FIG. 9A shows the actuating lever 50 according to an alternative exemplary embodiment of the invention. The actuating lever 50 is of rod-like design, that is to say, in contrast to the actuating lever 25, is not hollow. The actuating lever 50 is merely fastened at the actuating end 23 of the valve pin, said actuating end projecting out of the housing 22 of the drinking valve 21. This fastening takes place by a blind bore being located in the top end side of the fastening lever 50 and it being possible for the bottom region of the actuating end 23 to be pushed, with pre-stressing, into said blind bore. This produces a releasable, but otherwise fixed, connection between the actuating lever 50 and the actuating end 23. The result is that, when the actuating lever 50 is pivoted, such as by the starter body 10, the actuating end 23 of the valve pin is pivoted at the same time and the drinking valve 21 is thus opened. The length of the actuating lever 50 is such that the latter ends, by way of a free (bottom) end 51, at a small distance above the lowest location 27 on the base of the non-pivotable water-accommodating hollow 26. The actuating lever 50 can be moved all the way around, that is to say it can be pivoted as desired in all directions. In this case, the pivoting angle of the actuating lever 50 is limited by a stop of the bottom free end 51 on the stationary water-accommodating hollow 26 of the water-collecting bowl 24 attached below the water-supply line 20.

The actuating lever 50 is preferably formed from plastic, preferably as a solid plastic part. It is also conceivable, however, for the actuating lever 50 to be formed from steel, in particular stainless steel, or other safe metals, plastics or composites. The actuating lever 50 preferably also is provided with a striking color, preferably yellow or signal yellow. The actuating lever 50 thus also has an enticing effect on the animals, to be precise in particular young turkeys, which are thus encouraged to actuate the drinking valve 21.

If the drinking valve 21 has been opened by virtue of the actuating lever 50 being pivoted by the starter body 10, the water passing out of the drinking valve 21 at the bottom flows along the outside of the actuating lever 50 into the water-accommodating hollow 26 of the water-collecting bowl 24, which is immovable relative to the actuating lever 50. In this case, the water adheres by adhesion to the outer lateral surface of the actuating lever 50, with the result that all the water passes into the water-collecting bowl 24 and does not splash about. The actuating lever 50 shown in FIG. 9A has an optional encircling helix 52 on its outer, cylindrical lateral surface. The helix 52 projects outwards in relation to the otherwise smooth lateral surface of the actuating lever 50. By way of the helix 52, the water is guided along the actuating lever 50 from top to bottom and thus directed reliably into the water-collecting bowl 24. The water flowing along the outside of the actuating lever 50 continuously cleans the actuating lever 50, with the result that the drinking trough shown in FIG. 10 fulfils particularly stringent hygiene requirements. Equivalent structures can be used with the elongated actuating end 23 of the valve pin as disclosed in connection with FIG. 3.

Figure 9B:
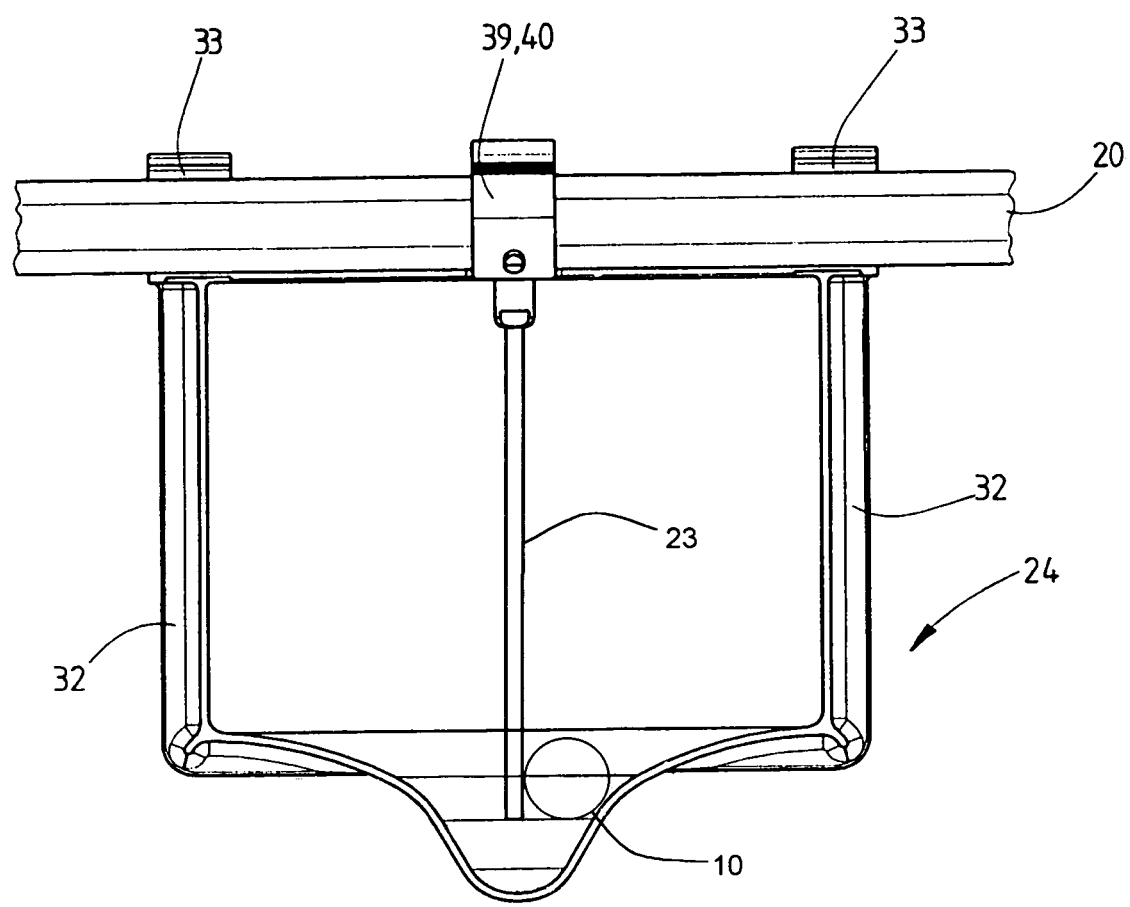
FIG. 9B shows an alternative drinking trough with the valve pin serving as the actuating means in a partial section.
Figure 10:
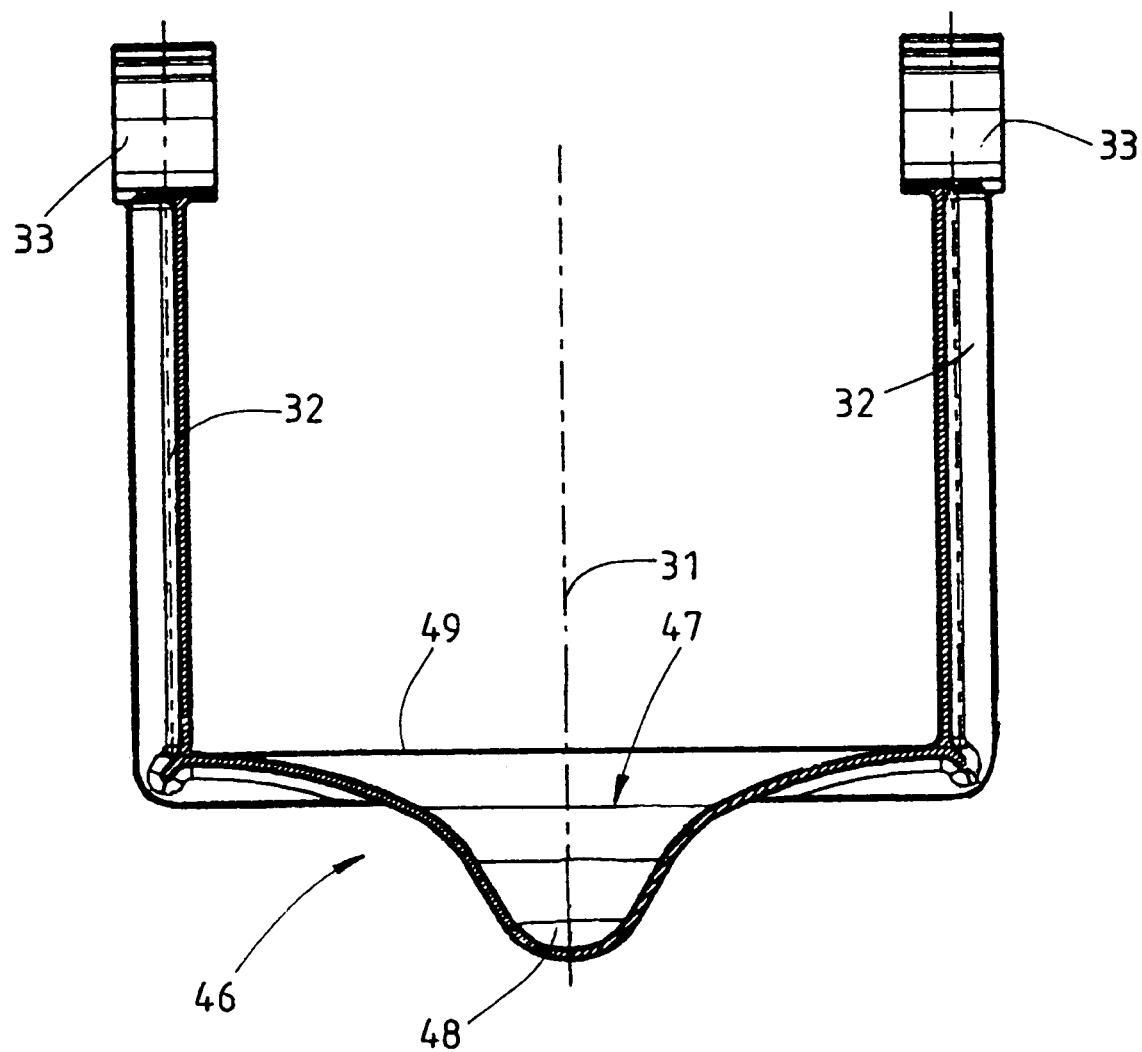
FIG. 10 shows a side view of a water-collecting bowl that is provided for fattening purposes and has a greater water-accommodating capacity.
Figure 11:
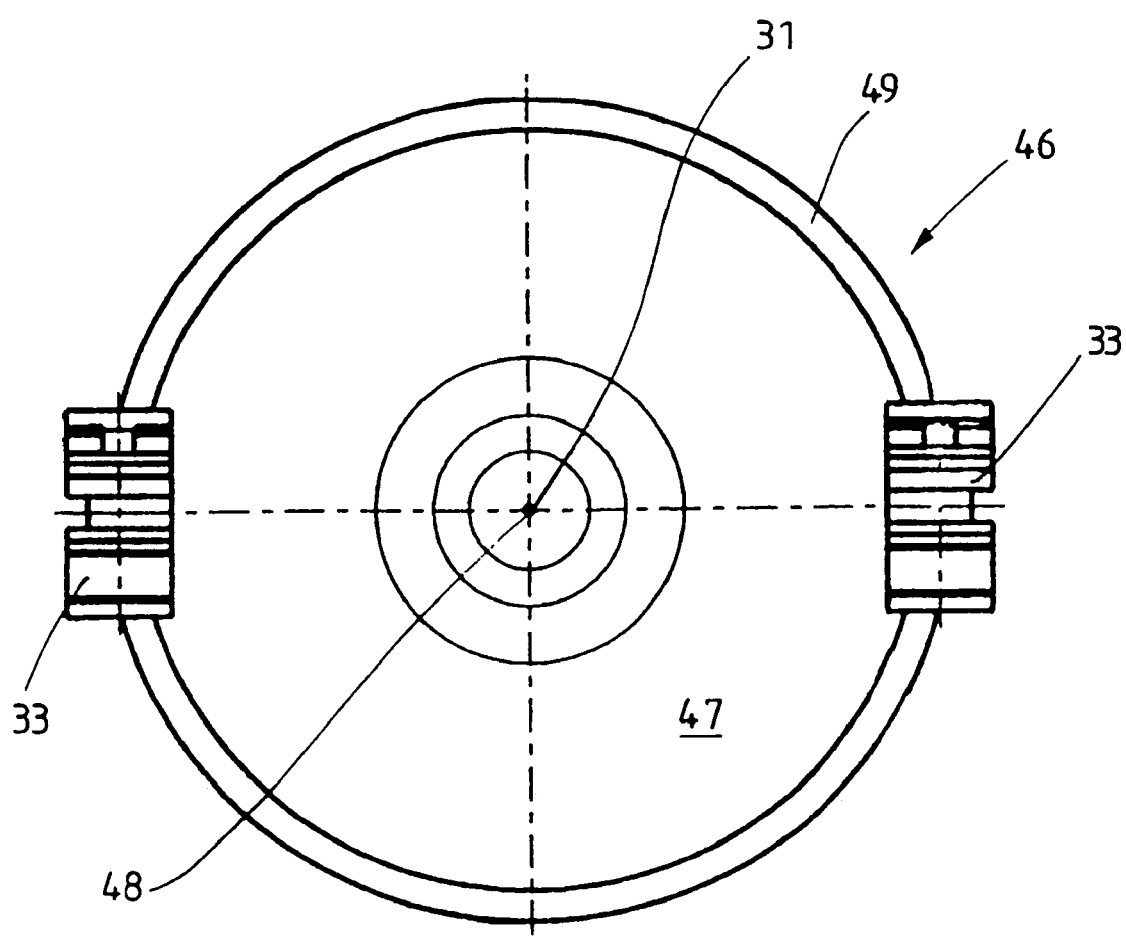
FIG. 11 shows a plan view of the water-collecting bowl in FIG. 10.

FIG. 9B also shows an elongated valve pin 23 functioning as the actuating means. According to this embodiment, the drinking valve has an elongated valve pin 23 that moves in order to discharge water into the water-collecting bowl 24 assigned to the respective drinking valve 21. As shown, the valve pin 23 extends into the water-collecting bowl 24 and the valve pin 23 is actuated by pivoting when the starter body 10 impinges against and pivots the valve pin 23. Thus, the water is discharged from the drinking valve by virtue of the elongated valve pin 23 being pivoted by the starter body 10. When the water level is low in the water-collecting bowl, the starter body 10 pivots the valve pin 23 and water is guided along the valve pin 23 directly into the water-collecting bowl 24.

FIGS. 10 to 13 show a water-collecting bowl 46 that is provided for fattening purposes, and that differs from the water-collecting bowl 24 in the design of the water-accommodating hollow 26. The supporting arms 32 are designed as for the water-collecting bowl 24, and in particular are spaced apart by the same distances and have the same clip closures 33, with the result that the water-collecting bowl 46 can be fitted at the same location of the water-supply line 20 used for fastening the water-collecting bowl 24. By virtue of the supporting arms 32 being arranged at the narrow end regions of the water-accommodating hollow 26, the long axis 29 of the water-accommodating hollow 26 is oriented longitudinally in relation to the water-supply line 20, with the result that, with the water-collecting bowl 24 fastened rigidly, that is non-pivotably, beneath the water-supply line 20, the elongate water-accommodating hollow 26 extends in the direction of the water-supply line 20. The longer axis 29 of the water-accommodating hollow 26 is preferably located vertically beneath the longitudinal center axis of the water-supply line 20, the plane of the border 28 of the water-accommodating hollow 26 running parallel to the longitudinal axis of the water-supply line 20. In the case of the usually horizontally directed water-supply line 20, the plane defined by the border 28 of the water-accommodating hollow 26 is thus also located in a horizontal.

Starting from the lowest location 48 up to the top border (or rim or edge) 49, the water-accommodating hollow 47 of the water-collecting bowl 46 has the same cross-sectional configuration. In the exemplary embodiment shown in FIGS. 10 and 11, the water-accommodating hollow 47 has circular cross sections over the entire height. All that changes, in the direction of the border 49, is the diameter of the water-accommodating hollow 47, which increases. However, the diameter increases disproportionately to the depth of the water-accommodating hollow 47, to be precise such that the diameter increases more quickly in the direction of the top border 49. On account of the circular cross-sectional configuration throughout, the water-collecting bowl 46 has a greater water-accommodating capacity than the water-collecting bowl 24. The water-collecting bowl 46 is thus particularly suitable for older animals that require more water.

The lowest location 48 of the water-accommodating hollow 47 of the water-collecting bowl 46 may be spaced apart from the water-supply line 20 by a greater distance than the lowest location 27 of the water-collecting bowl 24. This means that the bottom end 45 of the tube 35 of the actuating lever 25 is spaced apart by a greater distance from the lowest location 48 of the water-accommodating hollow 47 than is the case for the water-collecting bowl 24. On account of this, the actuating lever 25 can be pivoted through a larger angle, as a result of which a larger quantity of water is discharged by the respective drinking valve 21 per unit of time without the drinking valve 21 having to be exchanged for this purpose.

Figure 12:
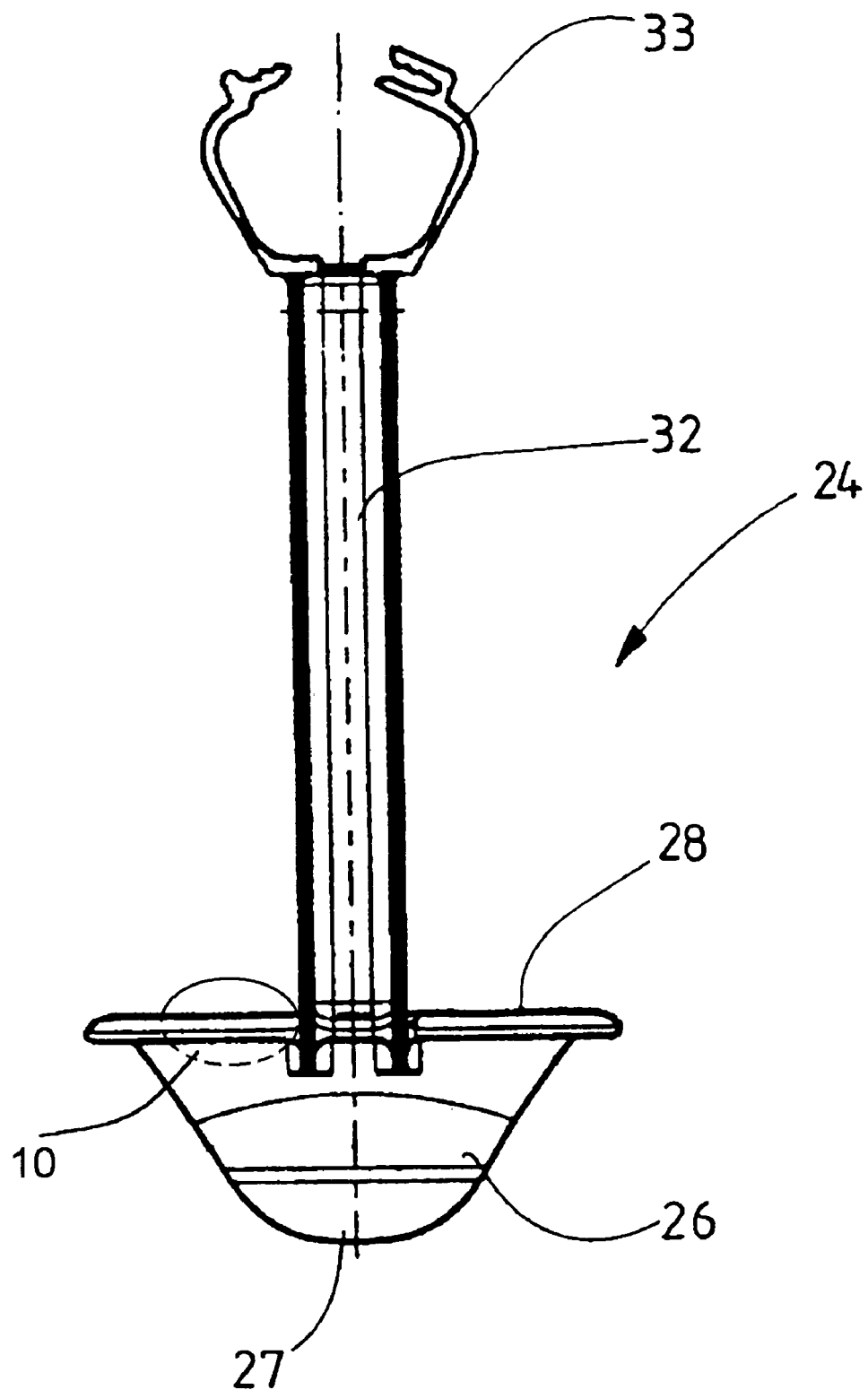
FIG. 12 shows a side view of the water-collecting bowl in FIG. 9A and illustrates a starter body having an ovaloid shape.
Figure 13:
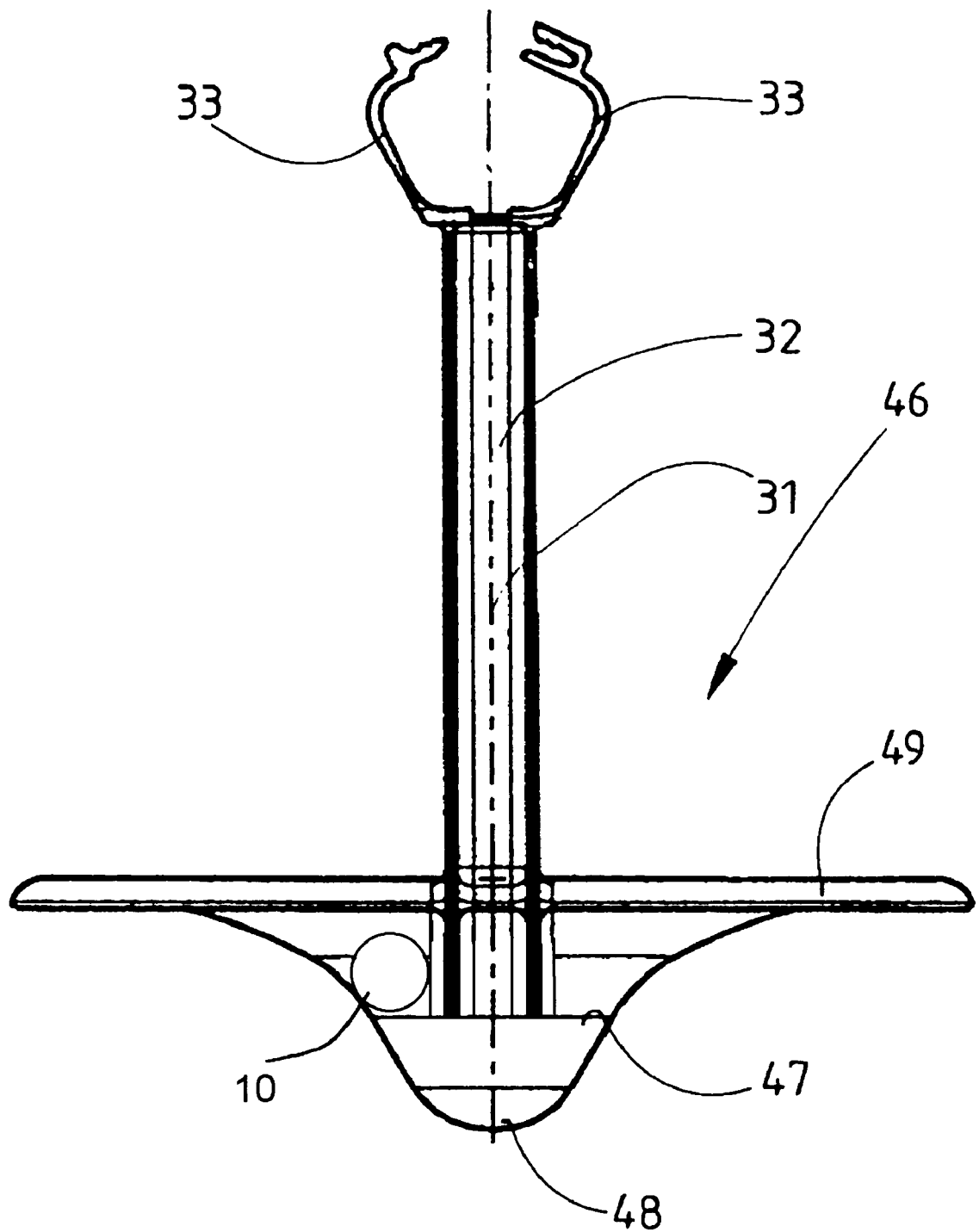
FIG. 13 shows a side view of the water-collecting bowl of FIGS. 7 and 11.

FIGS. 12 and 13 show that the two different water-collecting bowls 24, 46 allow straightforward conversion of the drinking trough. Such conversion takes place, for example, for housing young animals, namely chicks. In this case, the drinking trough is provided with actuating levers 25 and boat-like water-collecting bowls 24. In a fattening phase of the animals, following the breeding phase, allowances are made according to the invention for the then increasing water requirement of the animals in that the water-collecting bowls 24 with a smaller water-accommodating capacity are exchanged for water-collecting bowls 46 with a greater water capacity. For this purpose, merely the clip closures 33 on the supporting arms 32 of the water-collecting bowls 24 are opened and the water-collecting bowls 24 are separated from the water-supply line 20. The water-collecting bowls 46 then are fastened on the water-supply line 20 at the same locations. Conversely, following the fattening phase, the smaller water-collecting bowls 24 may be fitted on the water-supply line again.

In order that, on account of the increase in the amount of water required by the larger animals, a correspondingly larger quantity of water can pass out of the drinking valves 21, the water-collecting bowls 46 are dimensioned such that they allow the actuating levers 25, 50 to be pivoted further, as a result of which the drinking valves 21 can be opened further and a larger quantity of water can be discharged per unit of time.

As shown in FIGS. 12 and 13, the preferred water-collecting bowl 24, 46 has two parallel supporting arms 32 at opposite, narrow end regions of the elliptic border 28 of the water-accommodating hollow 26. The supporting arms 32, which are of identical design, extend vertically in the direction of the water-supply line 20. The top ends of the supporting arms 32 are each provided with a clip closure 33. The clip closures 33, which are of identical design, serve for connecting the water-collecting bowl 24 releasably to the water-supply line 20 via the supporting arms 32. In the closed state, the clip closures 33 engage all the way round the water-supply line 20.

It is conceivable, for the purpose of further increasing the amount of water required by the animals, for the purpose of reducing aggression and because a fair number of animals, for example, prefer to drink directly from drinking valves, to remove at least some of the actuating levers 25, 50 by releasing their latching connections from the fastening part 39 on the water-supply line 20 or from the actuating end 23 of the valve pin. For example, the drinking trough illustrated in FIG. 1 can be modified such that every second actuating lever 25 is removed. Larger animals then can open the drinking valves 21 directly at the actuating ends 23 of the valve pins. It is possible here for the animals to tilt the valve pin to the maximum extent and, in the case of corresponding drinking valves 21 being present, even to raise the valve pins, as a result of which the largest possible quantity of water can flow out of the drinking valve 21 per unit of time.

This invention also includes a method of actuating a drinking valve 21 of a drinking trough comprising the steps of providing a drinking trough with at least one actuating lever 25 extending from a valve pin to a water-accommodating hollow 26 of a water-collecting bowl 24; providing a pressured water source in fluidic connection with the drinking valve 21; and actuating an actuating lever 25 or an elongated actuating end 23 of a valve pin with a starter body 10 located in the water-collecting bowl 24, the starter body 10 being capable of displacing the actuating lever 25. Displacing the actuating lever 25 or an elongated actuating end 23 of a valve pin releases water from the water source into the water-collecting bowl 24. In this embodiment, the starter body 10 tilts the actuating lever 25 or an elongated actuating end 23 of a valve pin about a pivot pin such that the actuating lever 25 or an elongated actuating end 23 of a valve pin returns automatically to an initial position in which the valve pin is non-actuated and the drinking valve 21 is closed. As such, the method allows the drinking valve 21 without any direct contact between the animal and the actuating lever 25 or an elongated actuating end 23 of a valve pin to alternate between an actuated state when the water level is low and an unactuated state when the water level is high. This method allows for the automatic dispensing of water into a water-collecting bowl 24 when the water level in the water-collecting bowl 24 reaches a certain lower level.

It is further contemplated that common animal drinkers can be retrofitted so as to achieve the benefits of the present invention. For example, common valve pins can be retrofitted with actuating levers 25 or an elongated actuating end 23 of a valve pin and common water-collecting bowls 24 can be retrofitted with starter bodies 10. By retrofitting common animal drinkers with actuating levers 25 or an elongated actuating end 23 of a valve pin and starter bodies 10, one can turn a manual (animal actuated) drinker into an automatic drinker as disclosed herein.

The foregoing detailed description of the preferred embodiments have been presented only for illustrative and descriptive purposes and are not intended to be exhaustive or to limit the scope and spirit of the invention. The embodiments were selected and described to best explain the principles of the invention and its practical applications. One of ordinary skill in the art will recognize that many variations can be made to the invention disclosed in this specification without departing from the scope and spirit of the invention.

What is claimed is:

1. A drinking trough comprising:
   a) at least one drinking valve assigned to a water-supply line, the drinking valve having a pivotable valve pin that moves in order to discharge water;
   b) at least one water-collecting bowl assigned to the respective drinking valve;
   c) at least one pivotable actuating means extending from the valve pin to a water-accommodating hollow of the water-collecting bowl, the actuating means being movable between an actuated position to an unactuated position, the actuating means being an extension of the valve pin; and
   d) at least one starter body assigned to the respective water-collecting bowl, the starter body being removable from the drinking trough,
   wherein the starter body actuates the actuating means by pivoting the actuating means to the actuated position when water in the water-collecting bowl reaches a certain lower level, whereby the pivoting of the actuating means to the actuated position actuates the valve pin so as to allow water to flow from the drinking valve into the water-collecting bowl, and when the water in the water-collecting bowl reaches a certain higher level, the actuating means pivots to the unactuated position, whereby the pivoting of the actuating means unactuates the valve pin so as to cease the flow of water from the drinking valve.

2. Drinking trough according to claim 1, wherein the actuating means is arranged with respect to the valve pin such that the starter body pivots the actuating means to discharge water from the valve pin.

3. Drinking trough according to claim 2, wherein the starter body pivots the actuating means when the water in water-collecting bowl decreases beyond a defined level.

4. Drinking trough according to claim 3, wherein the starter body is located within the water-collecting bowl.

5. Drinking trough according to claim 4, wherein the starter body tilts the actuating lever about a pivot pin such that the actuating lever returns automatically to an initial position in which the valve pin is non-actuated and the drinking valve is in a closed configuration.

6. Drinking trough according to claim 5, wherein the starter body is constructed from plastic material.

7. Drinking trough according to claim 5, wherein the starter body has a density less than water.

8. Drinking trough according to claim 7, wherein the starter body has a weight of between 5 to 10 grams, a diameter of between 15 to 35 mm, and a density of less than 1 gram per cubic centimeter.

9. Drinking trough according to claim 1, wherein the actuating means is a hollow tube connected to the valve pin such that water flowing from the drinking valve flows within the hollow interior of the hollow tube into the water-collecting bowl.

10. Drinking trough according to claim 1, wherein the actuating means is a solid rod connected to the valve pin such that water flowing from the drinking valve flows on the outside lateral surface of the solid rod into the water-collecting bowl.

11. A method for actuating a drinking valve of a drinking trough comprising the steps of:
    a) providing a drinking trough with at least one pivotable actuating means extending from a valve pin to a water-accommodating hollow of a water-collecting bowl, the actuating means being an extension of the valve pin;
    b) providing a pressured water source in fluidic connection with the drinking valve;
    c) providing a starter body in the water collecting bowl such that the starter body is capable of displacing the actuating means between an actuated position and an unactuated position, the starter body being removable from the drinking trough; and
    d) pivotably actuating and unactuating the actuating means with the starter body as the water level in the water-collecting bowl rises and falls between certain levels,
    whereby pivotably displacing the actuating means by the starter body releases water from the water source into the water collecting bowl.

12. The method according to claim 11, wherein the starter body pivots the actuating lever about a pivot pin such that the actuating lever returns automatically to an initial position in which the valve pin is non-actuated and the drinking valve is closed.

13. The method according to claim 12, wherein the starter body pivots the actuating means when the water in the water-collecting bowl decreases beyond a set volume.

14. The method according to claim 11, wherein the starter body is constructed from plastic material.

15. The method according to claim 11, wherein the starter body has a density less than that of water.

16. The method according to claim 12, wherein the actuating means is a hollow tube connected to the drinking valve and water flowing from the drinking valve flows within the hollow interior of the hollow tube into the water-collecting bowl.

17. The method according to claim 12, wherein the actuating means is a solid rod connected to the drinking valve and water flowing from the drinking valve flows on the outside lateral surface of the solid rod into the water-collecting bowl.

18. The method according to claim 12, where the actuating means is an extension of a valve pin of the drinking valve and water flowing from the drinking valve flows on the outside lateral surface of the valve pin into the water-collecting bowl.

19. A drinking trough comprising:
    a) at least one drinking valve assigned to a water-supply line, the drinking valve having a pivotable valve pin that moves in order to discharge water;
    b) at least one water-collecting bowl assigned to the respective drinking valve; and
    c) at least one starter body assigned to the respective water-collecting bowl, the starter body being removable from the drinking trough,
    wherein the valve pin reaches into the water-collecting bowl, the valve pin being movable between an actuated position to an unactuated position, and the starter body actuates the valve pin by pivoting the valve pin to the actuated position when water in the water-collecting bowl reaches a certain lower level, whereby the pivoting of the valve pin to the actuated position actuates the drinking valve so as to allow water to flow from the drinking valve into the water-collecting bowl, and when the water in the water-collecting bowl reaches a certain higher level, the valve pin pivots to the unactuated position, whereby the pivoting of the valve pin unactuates the drinking valve so as to cease the flow of water from the drinking valve.

20. Drinking trough according to claim 19, wherein the starter body is a starter ball.

21. A method for actuating a drinking valve of a drinking trough comprising the steps of:
   a) providing a drinking trough with at least one pivotable valve pin extending from the drinking valve to a water-accommodating hollow of a water-collecting bowl;
   b) providing a pressured water source in fluidic connection with the drinking valve;
   c) providing a starter body in the water collecting bowl such that the starter body is capable of pivotably displacing the valve pin between an actuated position and an unactuated position, the starter body being removable from the drinking trough; and
   d) actuating and unactuating the valve pin with the starter body as the water level in the water-collecting bowl rises and falls between certain levels,
   whereby pivotably displacing the valve pin releases water from the water source into the water collecting bowl.

22. The method according to claim 21, wherein the starter body is a starter ball.

* * * * *